Sept. 1, 1942.   K. P. NEILSEN   2,294,568
BALL VALVE CAGE
Filed April 21, 1941
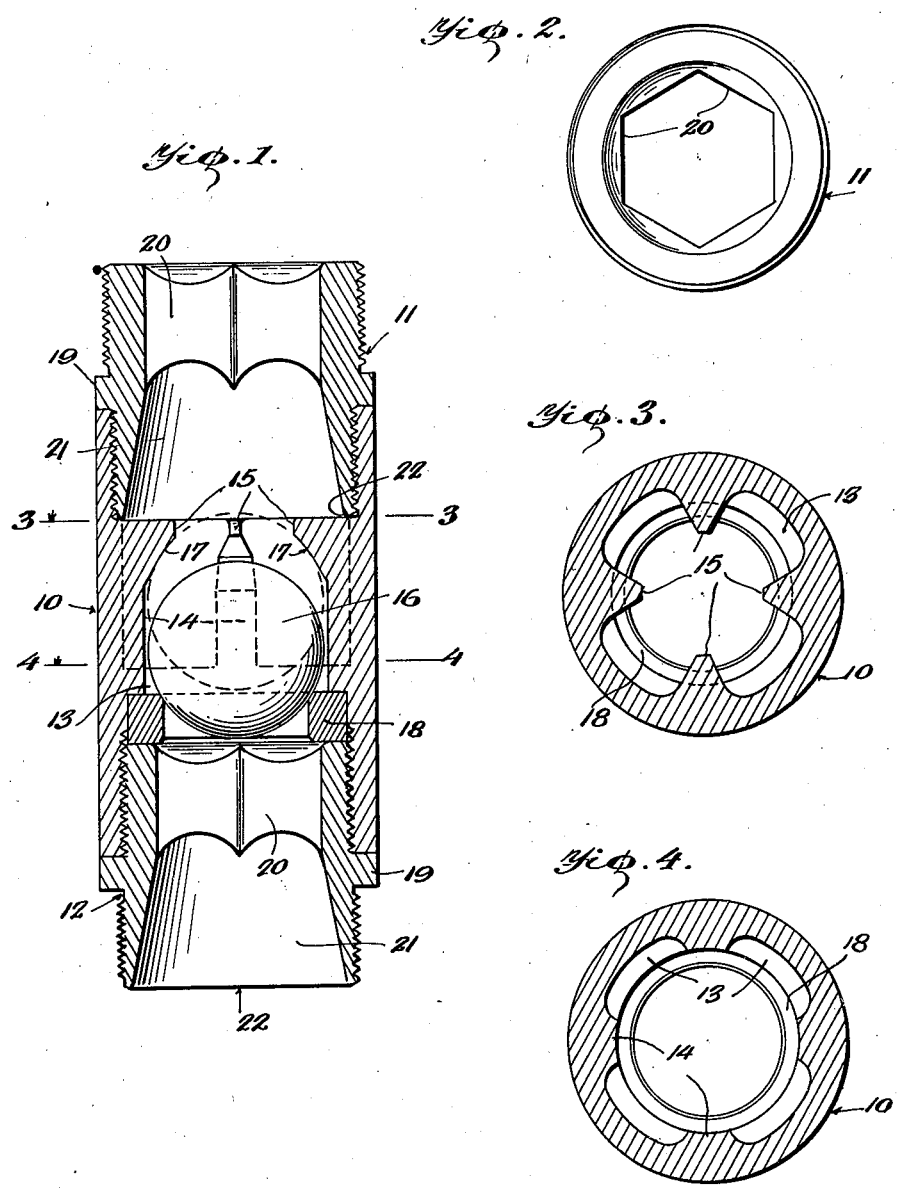
INVENTOR
Karl P. Neilsen,
BY
ATTORNEY Patented Sept. 1, 1942

2,294,568

UNITED STATES PATENT OFFICE 2,294,568

BALL VALVE CAGE

Karl P. Neilsen, Long Beach, Calif.

Application April 21, 1941, Serial No. 389,564

4 Claims. (Cl. 251—121)

This invention relates generally to a cage for a ball valve, and more particularly to a valve cage which, while especially designed for use in connection with oil well pumps, is readily adaptable to other types of pumps or check valves and, in fact, any character of machine where ball and seat valves are used.

It is well known in the pumping of oil wells, that the commonly used ball valve cages are subject to more or less rapid wear and deterioration by reason of turbulent spinning of the ball valves while off their seats, and that such turbulence also adversely affects the desirable quick, proper seating of the ball valves. For the most part, the turbulence or spinning of the ball valves is directly due to the use of ball stops, such as cross bars, in the use of which there is interposed in the fluid flow line, some element capable of deflecting fluid forcibly against the ball in a manner to cause substantially more than normal rotation of the ball against the ball guides.

It has been proposed to offset the above disadvantage by the use of ball controlling means, but as such means must move with the ball in its seating and unseating movements, they are objectionable from the standpoint of the addition of a movable part, as well as their adverse effect in many instances upon the free, maximum flow of fluid around the ball when the latter is unseated.

It is for these reasons, among others, that the present invention aims primarily to overcome the disadvantages of turbulent spinning of the valve ball by an arrangement which provides for the free maximum and balanced flow of fluid past the ball when unseated; which is devoid of parts from which fluid under pressure will be deflected against the ball when unseated, and which is likewise devoid of movable ball controlling elements or members.

In furtherance of the above aim, it is an additional object to provide a cage with integral ball guides and ball stops which are a part of the guides and so positioned that a streamlined flow of fluid is permitted around and past the valve ball, without obstruction, and in a manner which leaves the ball to freely rotate, without spinning, for normally, constantly shifting its seating surface.

Still another object is the provision of a ball cage with end adaptors of a character whereby external wrench gripping surfaces are eliminated, and the overall length of the cage and adaptors is substantially reduced.

The foregoing, with other and further objects of the invention, may be better understood and more thoroughly appreciated from the following detailed description of the improvements as applied to a closed type of valve cage I have shown by way of example in the accompanying drawing, which forms a part of this specification, and in which:

Figure 1 is a vertical, longitudinal sectional view through the ball cage of the above type, embodying the present invention, and through the proposed adaptors at its opposite ends.

Figure 2 is a top plan view of one of the adaptors, and,

Figures 3 and 4 are detail, transverse sectional views, taken respectively on lines 3—3 and 4—4 of Figure 1.

Referring now to the drawing, the closed type of cage selected for illustration of the invention, is shown in Figure 1 as consisting of a cylindrical casing 10 which is connected within well tubing by means of end adaptors 11 and 12. The construction of these adaptors, especially in certain respects, will be later dealt with.

The casing 10 is bored lengthwise and internally formed to provide a lower internal annular flange 13, from which lengthwise, circumferentially spaced ball guide ribs 14 extend upwardly in a manner best seen by a comparison of Figures 1 and 4.

The upper ends of the ribs 14, the spaces between which form fluid channels, are flared inwardly to form laterally reduced, relatively narrow ball stop fingers 15 extending inwardly, radially of the casing and grouped in spaced relation to one another around the axis of the casing as best seen in Figure 3. Since the fingers 15 are integral with the ribs 14, they may be hardened with the latter to form a lasting, durable guide and stop means for the ball 16, when the latter is unseated by the upward flow of fluid through the casing 10.

Preferably a portion, at least, of the current inwardly facing surfaces 17 along the flared upper ends of the ribs 14, adjoining the stop fingers 15, are along arcs coinciding with the spherical surface of the ball 16 so that the latter, when raised, may snugly seat against such arcs and fully shield the fingers 15 from the upflowing fluid. Due to this construction there can be no deflection of any portion of the fluid for adverse action upon, or turbulent spinning of, the ball 16, and the rising fluid can freely flow upwardly past the ball 16 in the spaces between the ribs.

By a careful consideration of Figures 3 and 4 it will be noted that the spaces between the ribs 14 are preferably milled or otherwise cored out so that they increase substantially in width as they deepen toward the wall of the casing radially with respect to its axis, and thus form fluid flow channels of ample capacity for the accommodation of the full fluid column.

The lower annular internal flange 13 may receive thereagainst the outer annular portion of a ball seat 18 of either plain or ring type, which seat is held in place by the lower adaptor 12, so that the ball 16 may effectively seat when it drops below the flange 13, especially in view of the means providing for elimination of turbulent spinning of the ball, while permitting of normal unrestricted rotation thereof, as above explained.

Above the stop fingers 15, and below the flange 13, the casing 10 is internally threaded for the reception of the correspondingly sized and threaded adaptor ends, that is, the lower end of the upper adaptor 11, and the upper end of the lower adaptor 12. Each of the adaptors has an external rib or flange 19 annularly thereof intermediate its ends. In order to reduce the lengths of the end adaptors and, in this way, the overall length of the valve cage, the rib or flange 19 is, in the present instance, of just sufficient width to function solely as a casing end abutment, without provision for wrench engagement. In other words flange 19, acting merely as an abutment, as stated, need be only about one-fourth of an inch in width, whereas the usual wrench engaging surface is about one and one-fourth inches. Thus a saving of about one inch can be made with each adaptor constructed as proposed herein.

Each adaptor 11, 12, is also internally formed to provide a polygonal bore 20, preferably hexagonal, for at least a portion of its length, to thus cooperate with an internal or bar wrench in turning the adaptor into, and out of, connected position. Preferably each adaptor also has a flared or gradually enlarging bore 21 below its hexagonal portion 20, and extending to substantially a feather edge 22 at its lower end to thus avoid presenting an internal shoulder in the path of the upflowing fluid.

Obviously, in consideration of the reduction of the overall length of the cage and its adaptors, by reason of the described construction of the latter with internal instead of external wrench engaging means, it is possible to position the standing and traveling valves definitely closer to each other in a pump. This is an important consideration in the pumping of oil wells, since it permits of material reduction of the space normally between the usual valves, in which gas may accumulate, and thus substantially reduces the danger of gas lock.

In further consideration of the foregoing construction, it is plain that in eliminating turbulent spinning of the ball and insuring an unobstructed, streamlined flow of fluid through the valve cage and its adaptors, the invention provides for quick, effective seating of the ball, as well as against destructive wear of the ball and ball guides when the ball is unseated, and also, in its use in connection with oil well pumping apparatus, avoids the disadvantages arising from the emulsification of oil and gas, or oil and water, in the presence of turbulence.

Having thus fully described the invention, what is claimed is:

1. A ball valve cage for oil well pumps, consisting of a cylindrical casing having internally threaded end portions and an annular flange therein at the inner end of one of said threaded end portions, lengthwise disposed valve guiding ribs rising from said flange and integral therewith and with the inner surface of the casing, said ribs having their upper ends terminating substantially at the inner end of the other threaded portion of the casing and provided with radially, inwardly projecting integral ball stop fingers grouped in spaced relation around the axis of the casing, and an adaptor threadedly engaging within the upper end of the casing and having a bore, the lower portion of which is downwardly flaring and terminates at the upper ends of the ball guide ribs, to thus insure streamlined, unobstructed flow of fluid through the casing and adaptor.

2. A ball valve cage for oil well pumps, consisting of a cylindrical casing having internally threaded upper and lower end portions and an inner annular flange adjacent to the inner end of the lower threaded portion, lengthwise disposed, annularly spaced, ball guide ribs rising from said flange and extending for the full space between the same and the upper threaded portion of the casing, said ribs having integral, radially inwardly projecting ball stop fingers at their upper ends, and upper and lower adaptors within the threaded portions of the casing, the upper adaptor having a downwardly flaring bore terminating at the upper ends of the ball guide ribs.

3. A ball valve cage assembly for oil well pumps, consisting of a cylindrical casing having internally threaded end portions, adaptors having threaded portions entering the casing ends and intermediate external portions constituting mere abutments against the cage ends, and of less than wrench engaging width, an annular flange within the casing and forming a downwardly facing valve seat supporting shoulder spaced from, and opposed to, the inner end of the lower adaptor, ball guide ribs flush with, and bottomed on, said flange and rising therefrom to the lower end of the upper adaptor, said ribs being integral with the casing and with said flange, and having at their upper ends radially, inwardly projecting ball stop fingers integral therewith, and said adaptors having bores, the approximately lower half portions of which flare downwardly and the approximately upper half portions of which present internal polygonal wrench engaging surfaces to thus provide an assembly of minimum length presenting a bore for the unobstructed flow of liquid therethrough.

4. A valve cage assembly for oil well pumps, including a valve cage and an end adaptor therefor, the said cage having inner integral valve guide ribs and ball stop fingers, and also having an internally threaded end portion above said stop fingers, and the adaptor being partially threaded into said end portion of the cage and presenting an external annular rib of a width substantially less than normal wrench-engaging width, and functioning merely as an abutment for the cage end, said adaptor having a bore, the upper portion of said bore presenting an internal wrench engaging surface, and the remaining portion thereof presenting a surface flared from said wrench-engaging surface to the lower end of the adaptor and terminating at the stop fingers, to thus form an assembly of minimum length insuring streamlined, unobstructed flow of fluid therethrough.

KARL P. NEILSEN.